United States Patent Office 3,636,200
Patented Jan. 18, 1972

3,636,200
PHARMACEUTICAL SUSPENSION
Margaret Rose Zentner, Montclair, N.J., assignor to Hoffmann-La Roche Inc., Nutley, N.J.
No Drawing. Filed June 9, 1969, Ser. No. 831,721
Int. Cl. A61k 27/06
U.S. Cl. 424—154
9 Claims

ABSTRACT OF THE DISCLOSURE

Palatable, stable, thixotropic pharmaceutical suspensions with desirable viscosity, suspendability, and reversible gel-sol-gel forming flow properties consisting of an active ingredient comprising in combination (a) a reaction product of a therapeutically active drug substance which is otherwise bitter tasting because it is weakly basic and which contains a secondary or tertiary nitrogen in combination with a complex magnesium aluminum silicate and (b) a product consisting essentially of microcrystalline cellulose containing from about 8 to about 12% by weight sodium carboxymethylcellulose, are disclosed.

BACKGROUND OF THE INVENTION

It has been demonstrated that certain secondary or tertiary nitrogen containing therapeutic substances, which are weakly basic in reaction, for example, certain therapeutically active benzodiazepines, may be formulated into essentially tasteless reaction products with certain complex magnesium aluminum silicates. The resulting tasteless reaction products form stable suspensions in pharmaceutically acceptable liquid vehicles which, in therapeutic value, compare favorably with suspensions containing the same concentration of therapeutically active substance and conventional suspending agents. It has been found, however, that suspensions containing relatively low concentrations, e.g., two percent weight to volume and below, of the reaction products of therapeutically active substances and complex magnesium aluminum silicates, exhibit an undesirably low sedimentation volume not present in suspensions containing higher concentrations, e.g., five percent weight to volume and above. The undesirable sedimentation volume required that additional amounts of complex magnesium aluminum silicates or conventional agents such as natural or synthetic gums such as, for example, tragacanth or clays such as bentonite had to be added to the drug complex magnesium aluminum silicate tasteless reaction product in order to achieve an acceptable suspension.

BRIEF SUMMARY OF THE INVENTION

The present invention comprises a method of forming improved suspensions containing relatively low concentrations of the reaction product of complex magnesium aluminum silicate and a therapeutically active, weakly basic compound by the addition thereto of microcrystalline cellulose which contains, in combination, about 8 to 12 percent by weight sodium carboxymethylcellulose.

DETAILED DESCRIPTION OF THE INVENTION

This invention is predicated on the discovery that the flow properties of an aqueous suspension containing the reaction product of a weakly basic, therapeutically active compound and a complex magnesium aluminum silicate may be, unexpectedly, markedly improved by the addition thereto of microcrystalline cellulose which contains, in combination, about 8 to 12 percent by weight sodium carboxymethylcellulose in an amount equal to from about 0.5 to 4.0 times the amount of the complex magnesium aluminum silicate present. The resulting suspension is clearly superior in such desirable properties as viscosity and suspendability and surprisingly exhibits excellent thixotropy. Thixotropy may be defined as the property of a suspension to undergo reversible gel-sol-gel formation. The excellent thixotropy of the suspensions of the present invention is unexpected as, although the microcrystalline cellulose containing 8 to 12 percent by weight sodium carboxymethylcellulose exhibits a degree of thixotropy, the reaction products of therapeutically active benzodiazepines and complex magnesium aluminum silicates do not exhibit the property. As a result of the excellent thixotropy possessed by the suspensions of the instant invention, they exhibit only a minimal sedimentation, even at relatively low concentrations, of the benzodiazepine-complex magnesium aluminum silicate reaction product, e.g., about two percent weight to volume and below.

The reason for the greatly improved flow properties and viscosity of the suspensions of the present invention is not clear. It can be speculated, however, that those reactive sites on the complex magnesium aluminum silicate which are not reacted with the weakly basic therapeutic compound are in some way reacted with the microcrystalline cellulose containing 8 to 12 percent sodium carboxymethylcellulose.

In the practice of the present invention it is preferred to add an amount of microcrystalline cellulose containing, in combination, 8 to 12 percent by weight sodium carboxymethyl-cellulose equal to from about 0.5 to about 4.0 times the weight of the therapeutic compound-complex magnesium aluminum silicate reaction product present in the suspension. In the most preferred embodiments approximately equal amounts of each are utilized.

In the practice of the present invention the preferred complex magnesium aluminum silicate is a standard article of commerce marketed by the R. T. Vanderbilt Company, Inc., New York, New York, under the trademark "Veegum." The chemical analysis of Veegum, expressed as oxides, is as follows:

| | Percent |
|---|---|
| Silicon dioxide | 61.1 |
| Magnesium oxide | 13.7 |
| Aluminum oxide | 9.3 |
| Titanium dioxide | 0.1 |
| Ferric oxide | 0.9 |
| Calcium oxide | 2.7 |
| Sodium oxide | 2.9 |
| Potassium oxide | 0.3 |
| Carbon dioxide | 1.8 |
| Water of combination | 7.2 |

In another preferred embodiment of the invention a complex magnesium aluminum silicate sold as "Neutral Veegum" is employed. Neutral Veegum, like the regular grade of Veegum, is a standard item of commerce marketed by the American Viscose Corporation, Marcus Veegum differs from the regular grade of Veegum in that its sodium content, expressed as sodium oxide, is about 1.0 percent. The regular grade of Veegum has a sodium content, expressed as sodium oxide, of about 2.9 percent. Neutral Veegum has an acid demand of less than 1 cc. of N/10 hydrochloric acid per gram, whereas the acid demand of the regular grade of Veegum is about 6 to 8 cc. of N/10 hydrochloric acid per gram.

It should be fully understood that, while the present invention will be described with particular reference to the use of Veegum-type products as the complex magnesium aluminum silicate reactant, the underlying principle of the invention is applicable equally to the use of other complex magnesium aluminum silicate compounds which are similar in nature and properties to Veegum-type products.

The preferred embodiment of the present invention encompasses the utilization of a water dispersible cellulosic colloid which is microcrystalline cellulose containing, in combination, about 8 to 12 percent sodium carboxymethylcellulose as a dispersion aid. Such a product is marketed by the American Viscose Corporation, Marcus Hook, Pa., under the trade name "Avicel-RC." It is to be understood, however, that any commercially available microcrystalline cellulose preparation having substantially similar characteristics can be utilized in the practice of the present invention.

The therapeutically active compounds which form substantially tasteless reaction products with the complex magnesium aluminum silicate in accordance with the present invention are those weakly basic drugs which contain a secondary or tertiary nitrogen atom in their structure. Specific examples of these therapeutic agents, which are all extremely bitter substances in a pure form, include 7-chloro-1-methyl-5-phenyl-3H-1,4-benzodiazepin-2(1H)-one;
7-chloro-2,3-dihydro-1-methyl-5-phenyl-1H-1,4-benzodiazepine;
7-chloro-2-methylamino-5-phenyl-3H-1,4-benzodiazepin-4-oxide;
4-(2-dimethylaminoethoxy)-N-(3,4,5-trimethoxybenzoyl)benzylamine;
d-3-methoxy-N-methylmorphinan;
d-1-tropic acid ester of 3-diethylamino-2,2-dimethyl-1-propanol;
2-chloro-9-(3-dimethylaminopropylidene)thioxanthene;
1-(4-chlorophenethyl)-2-methyl-6,7-dimethoxy-1,2,3,4-tetrahydroisoquinoline and the like and their medicinally acceptable acid addition salts such as, for example, the hydrochloride salt, the hydrobromide salt or the phosphate.

The ratio of complex magnesium aluminum silicate to bitter-tasting drug utilized in producing the tasteless reaction products described above has been found to be variable within rather wide limits. The ratio will, for the most part, depend upon the properties and characteristics of the particular drug being treated. However, it has been established that a ratio of at least one gram of the complex magnesium aluminum silicate, described herein, for each 0.01 millimole of the drug present will produce products having completely satisfactory properties. In many instances, substantially lesser quantities of the complex silicate can be used without adversely altering the desired properties of the final product. For example, in the case of certain drugs, satisfactory products have been obtained by using a ratio of as little as one gram of complex magnesium aluminum silicate for each 0.8 millimole of drug present. In any event, the optimum ratio of drug to complex silicate to be used in any particular instance can be determined readily by simple preliminary experimentation. The taste of the final drug preparation will serve as the indicia of whether the drug has been reacted with a sufficient quantity of the complex magnesium aluminum silicate.

The substantially tasteless reaction products of the therapeutically active compounds and complex magnesium aluminum silicates are prepared basically by mixing them in aqueous media. The ingredients may be mixed in the dry form or with the therapeutic compound in solution and the complex magnesium aluminum silicate in dry form or as an aqueous suspension. The benzodiazepine compound may be dissolved in aqueous, aqueous-alcoholic or alcoholic medium depending on relative solubilities in each. For those compounds which are relatively insoluble in water, any water-miscible monohydroxy aliphatic alcohol may be used.

The reaction may be carried out at room temperature or below or at elevated temperatures, e.g., up to about 95° C., the preferred temperature range being from about 25° C. to about 75° C. The reaction product may be dried and pulverized for storage or it may be utilized without isolation from the reaction media to form the improved suspensions of the present invention.

The improved suspensions of the present invention are formed by conventional methods long established in the art of pharmaceutical compounding. The suspensions may contain any of the conventional adjunct materials employed in formulating the suspensions of the prior art. For example, the improved suspensions according to the present invention can contain preservatives such as benzoic acid, methyl-p-hydroxybenzoate, propyl-p-hydroxybenzoate, sorbic acid and the like; buffers such as lactic acid, citric acid and the like; sweetening agents such as sugars or artificial sweeteners; antifoaming agents; certified coloring agents; natural and artificial flavoring agents and the like.

To illustrate the superior nature of the suspensions of the present invention, the following suspensions were prepared:

(I) A suspension was prepared containing 2.44 percent weight to volume of the reaction product of diazepam (7 - chloro - 1,3 - dihydro - 1 - methyl - 5-phenyl-2H-1,4-benzodiazepin-2-one) and complex magnesium aluminum silicate in an aqueous syrup vehicle. The suspension was not viscous and possessed pseudoplastic flow properties and no thixotropy. The sedimentation volume, after storage in undisturbed bottles for 30 days, was approximately 84 percent. After 120 days, the sedimentation volume became 55 percent.

(II) A suspension was prepared in a similar vehicle utilizing 2.0 percent weight to volume microcrystalline cellulose containing 8 to 12 percent by weight sodium carboxymethylcellulose. The suspension was initially of low viscosity. Upon aging, the viscosity increased somewhat and thixotropy was evident. There was, however, only slight gel formation.

(III) A similar suspension was prepared utilizing 2.4 percent weight to volume complex magnesium aluminum silicate. This suspension had a low viscosity, was only slightly thixotropic and did not form a gel.

(IV) A suspension was prepared in an analogous manner utilizing 2.44 percent weight to volume of the reaction product of diazepam and complex magnesium aluminum silicate and 2.0 percent weight to volume microcrystalline cellulose containing 8 to 12 percent by weight sodium carboxymethylcellulose. The suspension possessed a relatively high viscosity, even on initial formation and exhibited very pronounced thixotropy. Samples of this suspension packed in conventional shipping containers and driven 1700 miles in a commercial type shipping vehicle maintained their gel structure and showed no or very little sedimentation, e.g., 94–100 percent after 120 days.

The average apparent viscosity of 5 day old samples of each of the above suspensions at 0.3 r.p.m. is shown in Table I. A Brookfield LVT model, spindle No. 3 was utilized in all tests. The temperature for all tests was between 24° C. and 26° C. Measurements were taken in undisturbed four ounce amber round bottles. The bottles were rolled to restore homogeneity of suspension in those instances where sedimentation had occurred.

TABLE I

| Suspension | Viscosity in cps. |
|---|---|
| I | 6,000 |
| II | [1] 2,000 |
| III | 6,000 |
| IV | [1] 32,000 |

[1] Suspensions containing microcrystalline cellulose with 8 to 12 percent by weight sodium carboxymethylcellulose will increase somewhat in viscosity upon standing for several weeks.

The foregoing figures clearly illustrate the superiority in pharmaceutically desirable properties of the suspensions of the present invention. For a fuller understanding of the nature and objects of this invention reference may be had to the following examples which are given as a further illustration of the invention and are not to be construed in a limiting sense. All parts given in the examples are parts by weight unless otherwise indicated.

EXAMPLE 1

An adsorbate of diazepam and Neutral Veegum was initially prepared as follows:

1.05 grams of diazepam, a bitter tasting drug, was added to and dissolved in a mixture of 30.0 cc. of ethyl alcohol and 20.0 cc. of distilled water at a temperature of about 50° C. The solution while still warm was added to and mixed with 60.0 grams of Neutral Veegum. A small additional quantity of similar ethyl alcohol-water mixture was added subsequently to insure complete and thorough wetting of the mixture. The mixture was then stirred for a period of 30 minutes. Thereafter, the product was dried to constant weight at a temperature of 45° C., following which the dry powdery product was pulverized.

24.42 grams of the product produced in the preceding paragraph and 20.0 grams of Avicel-RC (microcrystalline cellulose containing 8 to 12 percent sodium carboxymethylcellulose) were formulated into an aqueous suspension in the following manner:

The diazepam-Veegum product was dispersed in 220 distilled water at 90° C. which contained 0.9 gram methyl-p-hydroxybenzoate and 0.2 gram propyl-p-hydroxybenzoate. The dispersion was thoroughly mixed for about 10 minutes after which the Avicel-RC was added and the whole thoroughly stirred. 125.0 grams glycerin and 143.0 grams sorbitol were added and the dispersion was cooled to room temperature. The dispersion was then homogenized and 550.0 grams of sucrose were dissolved therein with slight warming. Subsequently, a solution containing 25.0 cc. of distilled water, 1.5 grams sodium hydroxide, 2.5 grams benzoic acid, 1.0 gram sodium cyclamate, 0.1 gram sodium saccharin and 0.1 gram of disodium EDTA was added to the dispersion. Immediately afterward, 10.0 grams of lactic acid were added and the dispersion was thoroughly agitated to achieve a uniform mixture.

A dispersion containing 0.033 gram of Antifoam C (a silicone-type antifoaming agent having a silicone content of 30 percent manufactured and sold by Dow Corning Corporation, Midland, Mich.) was prepared and added to the mixture described in the preceding paragraph. To the mixture thus produced there was added a filtered solution of FD and C colors and flavoring agents as needed. Thereafter, the pH of the product was adjusted to about 4.0 with sodium hydroxide. Finally, distilled water was added to the preparation to a volume of 1000 cc. and the suspension was mixed, homogenized and deaerated.

EXAMPLE 2

A suspension was prepared utilizing 7-chloro-2,3-dihydro - 1 - methyl-5-phenyl-1H-1,4-benzodiazepine hydrochloride as the therapeutically active compound.

In this example, 5.0 grams Neutral Veegum and 20.0 grams Avicel-RC were dispersed in 280 cc. distilled water at about 80° C. To this dispersion was added amounts of sorbitol, glycerin and the p-hydroxybenzoate preservatives corresponding to those utilized in Example 1 and the whole was homogenized. 500 grams sucrose were dissolved in the resulting aqueous dispersion with warming to about 40° C.

1.05 grams of 7-chloro-2,3-dihydro-1-methyl-5-phenyl-1H-1,4-benzodiazepine hydrochloride dissolved in 40.0 cc. distilled water were then added and the whole was thoroughly mixed.

The remaining sweeteners, flavoring agents, coloring agents and the like shown in Example 1 were added in similar quantities and the final suspension was adjusted to 1000 cc., homogenized and deaerated.

EXAMPLES 3 AND 4

In the manner of Example 1 suspensions were formulated utilizing reaction products comprising 0.2 gram 4 - (2 - dimethylaminoethoxy)-N-(3,4,5-trimethoxybenzoyl)benzylamine hydrochloride and 0.85 gram Neutral Veegum; and 0.2 gram 2 - chloro - 9-(3-dimethylaminopropylidene)thioxanthene hydrochloride and 9.85 gram Neutral Veegum, respectively.

EXAMPLE 5

In a similar manner, a suspension was formulated utilizing equal amounts of Avicel-RC 101 and the powder obtained by grinding together in a mortar 0.31 gram d-3-methoxy-N-methylmorphinan hydrobromide and 1.24 grams Veegum, granulating the mixture with 6.5 cc. distilled water and drying at a temperature of about 45° C.

What is claimed:

1. An improved palatable pharmaceutical suspension with desirable viscosity, suspendability, and reversible gel-sol-gel forming thixotropic flow properties comprising a medicinally acceptable liquid vehicle having suspended therein an active ingredient consisting essentially of the reaction product produced by mixing complex magnesium aluminum silicate with a therapeutically active, weakly basic compound characterized in that it is otherwise bitter tasting because it contains in its structure a secondary or tertiary nitrogen in combination with a product consisting essentially of microcrystalline cellulose and from about 8 to about 12% by weight sodium carboxymethylcellulose said product being present in from about 0.5 to about 4.0 times the weight of said complex magnesium aluminum silicate present in said suspension.

2. The improved pharmaceutical suspension in accordance with claim 1 wherein said therapeutically active weakly basic compound is selected from the group consisting of 4 - (2 - dimethylaminoethoxy)-N-(3,4,5-trimethoxybenzyl)benzylamine and salts thereof with a medicinally acceptable acid.

3. The improved pharmaceutical suspension in accordance with claim 1 wherein said therapeutically active weakly basic compound is selected from the group consisting of d-3-methoxy-N-methylmorphinan and salts thereof with a medicinally acceptable acid.

4. The improved pharmaceutical suspension in accordance with claim 1 wherein said therapeutically active, weakly basic compound is selected from the group consisting of 2 - chloro - 9 - (3-dimethylaminopropylidine) thioxanthene and salts thereof with a medicinally acceptable acid.

5. The improved pharmaceutical suspension in accordance with claim 1 wherein said therapeutically active, weakly basic compound is a benzodiazepine compound.

6. The improved pharmaceutical suspension in accordance with claim 6 wherein said benzodiazepine compound is diazepam.

7. The improved pharmaceutical suspension in accordance with claim 6 wherein said benzodiazepine compound is 7 - chloro - 2,3 - dihydro - 1-methyl-5-phenyl-1H-1,4-benzodiazepine or a salt thereof with a medicinally acceptable acid.

8. The improved pharmaceutical suspension in accordance with claim 6 wherein said benzodiazepine compound is chlordiazepoxide or a salt thereof with a medicinally acceptable acid.

9. In a method of forming a pharmaceutical suspension by suspending a stable, palatable reaction product produced by mixing complex magnesium aluminum silicate with a therapeutically active, weakly basic compound characterized in that it is otherwise bitter tasting because it contains in its structure a secondary or tertiary nitrogen in a medicinally acceptable liquid vehicle, the improvement whereby desirable viscosity, suspendability and reversible gel-sol-gel forming thixotropic flow properties are obtained which comprises suspending said reaction product in combination with a product consisting essentially of microcrystalline cellulose and from about 8 to about 12% by weight sodium carboxymethylcellulose, said product being present in from about 0.5 to about 4.0 times the weight of said complex magnesium aluminum silicate present in said suspension.

References Cited

UNITED STATES PATENTS

| | | | |
|---|---|---|---|
| 3,060,086 | 10/1962 | Kueter | 424—260 X |
| 3,140,978 | 7/1964 | Zentner | 424—260 |
| 3,146,168 | 8/1964 | Battista | 424—362 X |
| 3,248,290 | 4/1966 | Zentner | 424—362 X |
| 3,251,824 | 5/1966 | Battista | 424—362 X |
| 3,337,402 | 8/1967 | Zentner | 424—184 |
| 3,337,403 | 8/1967 | Zentner | 424—184 |
| 3,347,744 | 10/1967 | Latshaw et al. | 424—362 X |

SHEP K. ROSE, Primary Examiner

U.S. Cl. X.R.

424—155, 244, 260, 276, 357, 362